A. D. SPENCER,

Assignor, by mesne assignments, of part interest to W. STEWART & C. H. COLBURN.

Packing Device for Packing-Boxes, &c.

No. 8,977. Reissued Nov. 25, 1879.

*Attest:*
J. Thompson
Wm. Dodge

*Inventor:*
Allen D. Spencer,
by G. H. W. T. Wood
Attys

N. PETERS, PHOTO-LITHOGRAPHER, WASHINGTON, D. C.

UNITED STATES PATENT OFFICE.

ALLEN D. SPENCER, OF BALTIMORE, ASSIGNOR, BY MESNE ASSIGNMENTS, OF PART INTEREST TO WILLIAM STEWART, OF SAME PLACE, AND CHARLES H. COLBURN, OF SNOW HILL, MARYLAND.

IMPROVEMENT IN PACKING DEVICES FOR PACKING-BOXES, &c.

Specification forming part of Letters Patent No. 205,433, dated June 25, 1878; Reissue No. 8,977, dated November 25, 1879; application filed October 1, 1879.

*To all whom it may concern:*

Be it known that I, ALLEN D. SPENCER, of the city of Baltimore and State of Maryland, have invented an Improved Packing Device for Packing-Boxes, &c., of which the following is a specification; and I do hereby declare that in the same is contained a full, clear, and exact description of my said invention, reference being had to the accompanying drawings, and to the letters of reference marked thereon.

This invention has reference to that class of packing devices for stuffing or packing boxes wherein a steam-tight joint is formed between the rod or stem and the packing-rings surrounding the same by the pressure of steam admitted to the exterior surface or outer circumference of the rings; and the invention consists in inclosing the packing-rings within and by a frame or cage containing appliances for sustaining the rings in position when not acted upon by the steam seeking to escape; and, further, in the construction of the various parts of the device, as will hereinafter fully appear.

In the description of the invention which follows, reference is made to the accompanying drawings, forming a part hereof, and in which—

Figure 1:
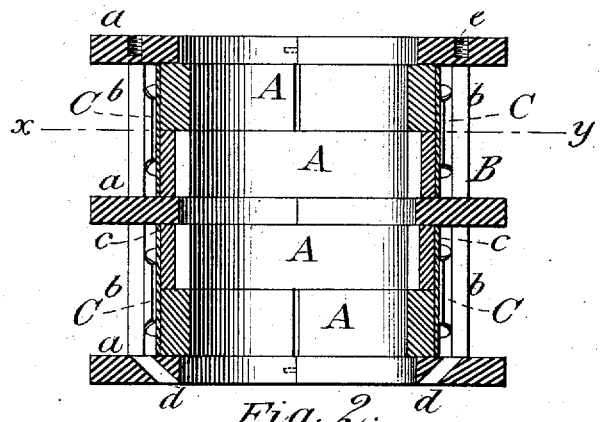
Figure 2:
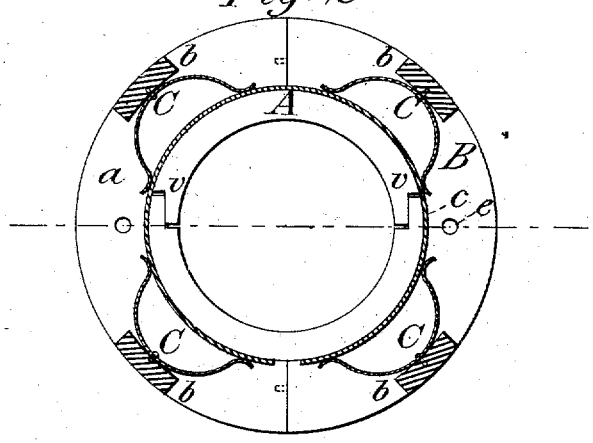
Figure 3:
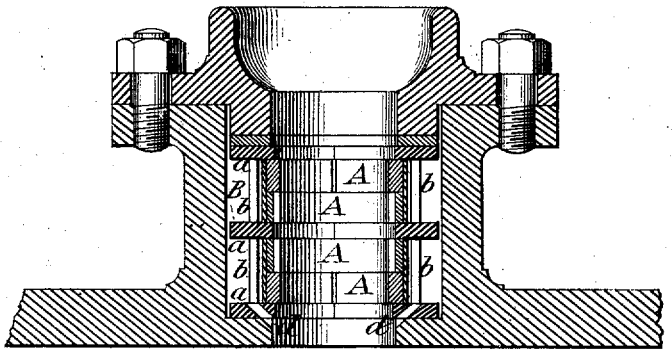

Figure 1 is a vertical section of the improved packing device. Fig. 2 is a transverse section of the invention on the dotted line *x y*. Fig. 3 is sectional view of a part of a steam-cylinder head, showing the present invention as applied thereto.

Similar letters of reference indicate similar parts in all the views.

A A are the packing-rings inclosed in and by a skeleton frame or cage, B. The rings A are each in two parts, jointed together, substantially as shown at *v* in Fig. 2 of the drawings, which method of forming the joints admits of the two parts of the ring being slightly distended or contracted without disclosing an aperture for the escape of steam.

The cage B consists of a series of annular partitions, *a*, connected by bars *b*, and is in two parts, pinned together, as shown in the drawings.

Each set of packing-rings—that is to say, the rings contained in each compartment of the cage—is surrounded by a spring-ring, *c*, which binds them together, and allows of their being handled without danger of separation.

C C are springs secured to the bars *b*, which serve to retain the packing-rings about centrally of the cage, and also to place a slight strain upon said rings and the rod inclosed by them.

Steam is admitted exteriorly of the packing-rings through the apertures *d*, the said rings being forced closely in contact with the rod. Upon the opening of the exhaust and the escape of the steam from the cylinder all pressure is removed from the rings except that resulting from the resiliency of the springs, which is trifling, and practically causes no friction between the rod and the packing-rings.

The cage is held within the packing-box by means of the gland; and in order to effect a tight joint between the said parts a gasket of gum or other elastic material is inserted and held between them. The cage may be easily withdrawn from the stuffing-box after the removal of the gland by means of threaded handles, which are screwed into the holes *e*.

This invention, although described exclusively in connection with a steam-engine, is alike applicable to air-compressors, water-motors, the stuffing-boxes located at the inner end of the dead-wood of propeller-ships, and a variety of other purposes.

Another feature of my invention consists in the arrangement of the cage or shell in a skeleton form, by means of which the steam is made to perform a function new in this art and of great importance—*i. e.*, exert a force upon the packing-rings through the openings in the cage or shell.

The result sought and obtained in this case differs from that of other metallic packings, inasmuch as the bearing of the packing in this case is equal upon every portion of the rod, and necessarily accommodates itself to every inequality upon the surface of the rod.

Having thus described my invention, what I claim as new, and wish to secure by Letters Patent of the United States, is—

1. In a piston-packing, the combination of a sectional skeleton cage or shell in which are confined a series of packing-rings having broken joints formed by rabbets, and springs for retaining said rings in position, substantially as and for the purpose set forth.

2. In a piston-packing, the combination of a sectional skeleton cage or shell in which are confined a series of packing-rings having broken joints formed by rabbets and their retaining-springs with the lateral pressure-springs, substantially as and for the purpose set forth.

3. In a piston-packing, the combination of a skeleton shell or cage having steam-ports and the two-part rings having rabbeted ends and arranged to break joint, substantially as and for the purpose set forth.

4. In a piston-packing, the combination of the skeleton shell or cage having steam-ports and secured in position by a gland, the rings arranged to break joints, and retaining-springs for the same, substantially as and for the purpose set forth.

5. The cage B, formed in two parts, as shown, and consisting of the annular partitions *a* and the connecting-bars *b*, substantially as herein set forth.

6. The cage B, formed in two parts, as shown, and consisting of the annular partitions *a* and connecting-bars *b*, combined with the packing-rings A and springs C and *c*, substantially as specified.

7. The cage B, having the steam-apertures *d*, combined with the packing-rings A and springs C and *c*, substantially as described.

In testimony whereof I have hereunto subscribed my name this 25th day of April A. D. 1878.

ALLEN D. SPENCER.

Witnesses:

WM. C. NICHOLLS,
WILLIAM HADEL.